(12) United States Patent
Nuttall et al.

(10) Patent No.: US 7,073,773 B2
(45) Date of Patent: Jul. 11, 2006

(54) RAPID CONNECTION COUPLING

(75) Inventors: David A. Nuttall, Amherst, OH (US);
Jens Farwer, Bad Oeynhausen (DE);
Wolfgang Weh, Siemensstr. 5,
D-89257, Illertissen (DE); Erwin Weh,
Siemensstr. 5, D-89257, Illertissen (DE)

(73) Assignees: Invacare Corporation, Elyria, OH (US); Wolfgang Weh, Illertissen (DE); Erwin Weh, Illertissen (DE)

( * ) Notice: Subject to any disclaimer, the term of this patent is extended or adjusted under 35 U.S.C. 154(b) by 707 days.

(21) Appl. No.: 10/109,580

(22) Filed: Mar. 27, 2002

(65) Prior Publication Data

US 2005/0167981 A1    Aug. 4, 2005

Related U.S. Application Data

(60) Provisional application No. 60/279,140, filed on Mar. 27, 2001.

(51) Int. Cl.
*F16L 37/18* (2006.01)

(52) U.S. Cl. .............................. 251/149.6; 137/614.03; 285/316

(58) Field of Classification Search ........... 137/614.03, 137/614.04, 614.05; 251/149.6; 285/316
See application file for complete search history.

(56) References Cited

U.S. PATENT DOCUMENTS

| | | | |
|---|---|---|---|
| 2,754,135 A * | 7/1956 | Kramer | ....................... 285/101 |
| 4,543,995 A | 10/1985 | Weh et al. | |
| 4,716,938 A | 1/1988 | Weh et al. | |
| 5,095,947 A | 3/1992 | Weh et al. | |
| 5,209,528 A | 5/1993 | Weh et al. | |
| 5,312,084 A | 5/1994 | Weh et al. | |
| 5,575,510 A | 11/1996 | Weh et al. | |
| 5,582,223 A | 12/1996 | Weh et al. | |
| 5,706,967 A | 1/1998 | Weh et al. | |
| 5,927,683 A | 7/1999 | Weh et al. | |
| 5,957,468 A | 9/1999 | Weh et al. | |
| 5,988,165 A | 11/1999 | Richey, II et al. | |
| 6,035,894 A | 3/2000 | Weh et al. | |

(Continued)

OTHER PUBLICATIONS

International Search Report mailed on Aug. 6, 2002.

*Primary Examiner*—Kevin Lee
(74) *Attorney, Agent, or Firm*—Calfee, Halter & Griswold LLP

(57) ABSTRACT

The invention concerns a rapid connection coupling (10) for transferring high-pressure gases and/or liquid, in particular for refilling a high-pressure, mobile container such as a gas cylinder with oxygen in a home environment or at a transfill station with a transfill device. The coupling in question comprises the following elements: a tubular housing (11), an outer sliding sleeve (18) which can slide relative to the housing (11); a number of radially expanding collet chuck elements (15) mounted on the housing (11) and provided with an engaging contour (17) which facilitates connection to a matching connection fitting (30); and a sealing piston (22) capable of sliding centrally inside the housing (11), the said sealing piston being brought into contact with the connecting fitting (30). Internal parts (e.g., pin 25*b* and pin 25*c*) of the coupling are characterized by having a reduced or minimized volume, thereby reducing the volume of fluid expelled when removing the fitting (30) from the coupling (10), thereby reducing the intensity of sound created by disconnecting the fitting (30) from the coupling (10). Additionally, the coupling (10) is characterized by being easy to use and by having a relatively low parts count.

20 Claims, 15 Drawing Sheets

U.S. PATENT DOCUMENTS

| | | |
|---|---|---|
| 6,073,971 A | 6/2000 | Weh et al. |
| 6,099,044 A | 8/2000 | Weh et al. |
| 6,264,245 B1 | 7/2001 | Weh et al. |
| 6,375,152 B1 | 4/2002 | Weh et al. |
| 6,382,273 B1 | 5/2002 | Weh et al. |
| 6,393,802 B1 | 5/2002 | Bowser et al. |

* cited by examiner

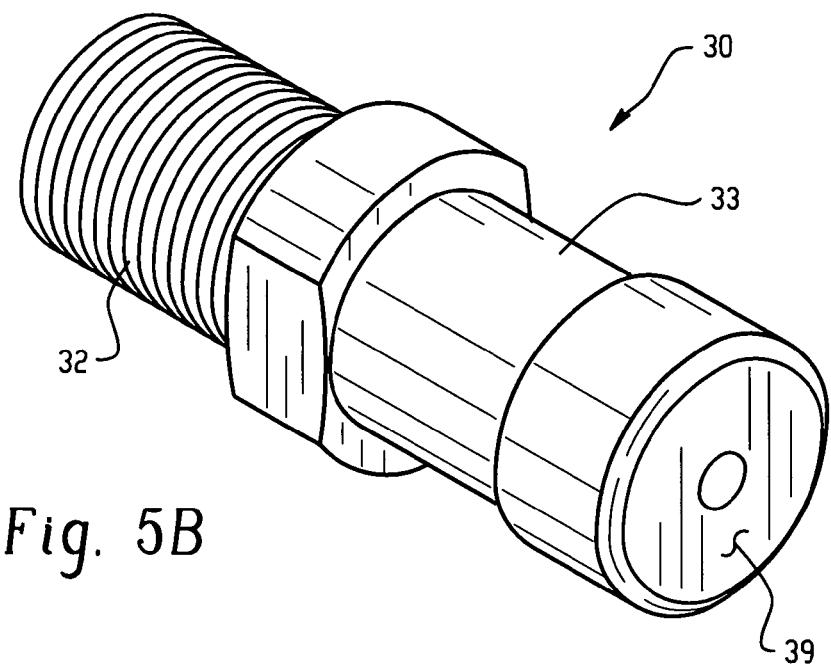
Fig. 5B
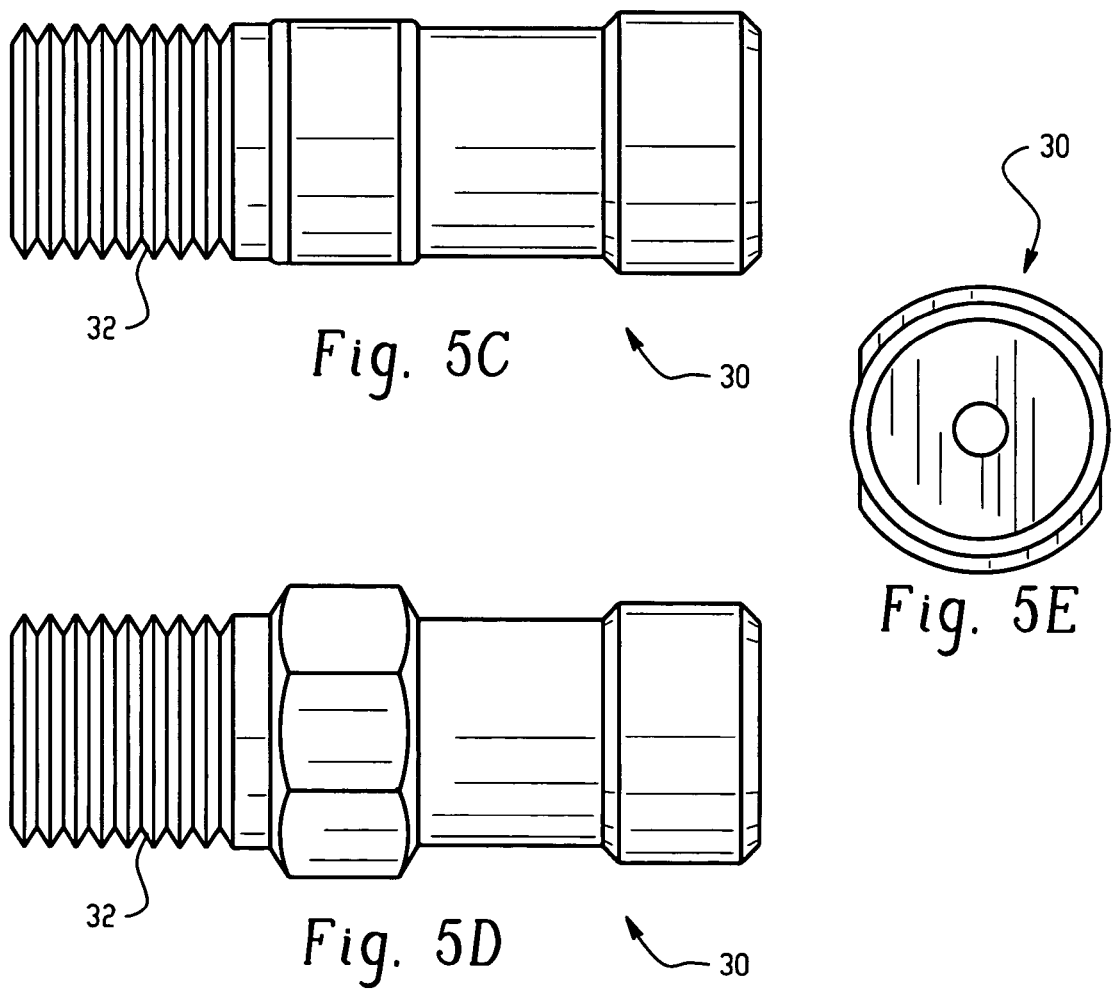
Fig. 5C
Fig. 5D
Fig. 5E

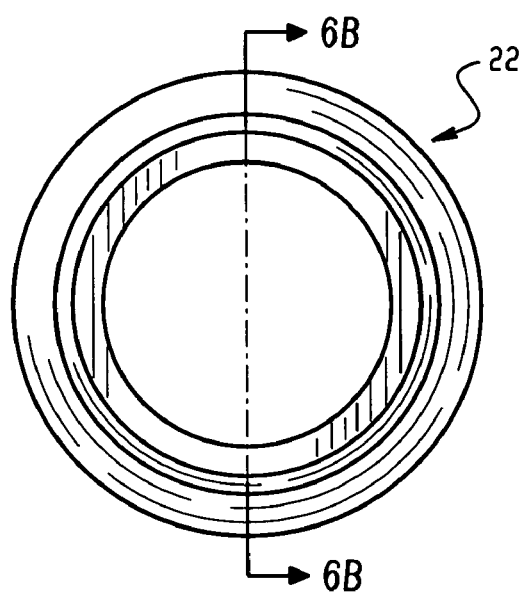
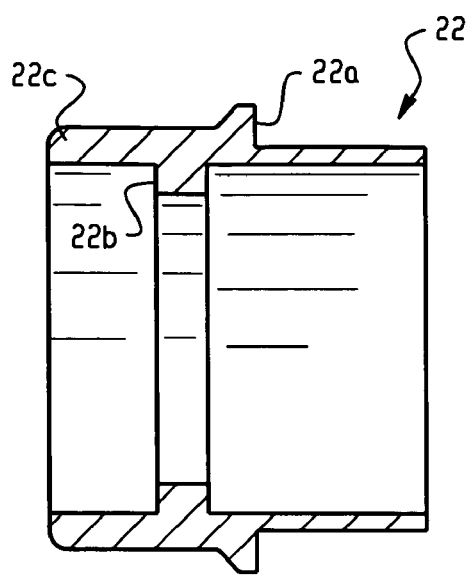
Fig. 6A
Fig. 6B
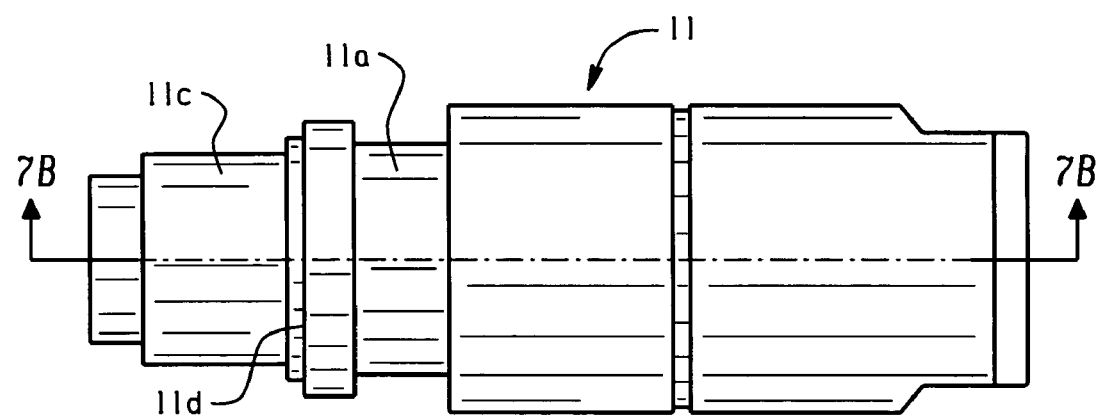
Fig. 7A
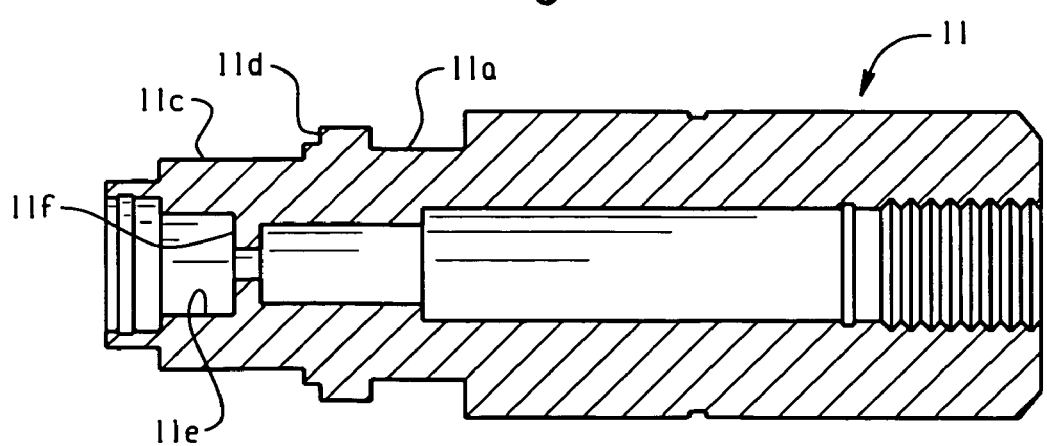
Fig. 7B

RAPID CONNECTION COUPLING

CROSS-REFERENCE TO RELATED APPLICATIONS

This application claims priority to and the benefit of U.S. Provisional Application Ser. No. 60/279,140, filed on Mar. 27, 2001.

FIELD OF THE INVENTION

This invention relates to a rapid connection coupling for transferring gaseous and/or liquid fluids, especially for refilling a high-pressure, mobile container such as a gas cylinder with oxygen in a home environment.

BACKGROUND OF THE INVENTION

Rapid connection couplings for transferring gaseous and/or liquid fluids are known. Examples of such rapid connection couplings are shown and described in U.S. Pat. Nos. 5,927,683 and 5,575,510 and in EP-A 0 340 879 and WO-A 93/20378.

The known rapid connection couplings have a number of disadvantages making them unsuitable for use in refilling a high-pressure, mobile container (such as a gas cylinder) with oxygen in a home environment. The disadvantages of known rapid connection couplings include at least one or more of the following: (i) being relatively complicated to use, making them more suitable for use by a suitably trained cylinder refilling technician, (ii) allowing an unacceptably large amount of high-pressure gas to escape when the coupling is disengaged from a mating fitting affixed to the cylinder, creating an unacceptably loud sound, and possibly causing the fitting and cylinder to forcibly separate from the rapid connection coupling, creating the risk of a projectile hazard, and (iii) having a relatively high parts-count and an a correspondingly high relative cost to manufacture.

There is a need, therefore, for an improved rapid connection coupling for transferring gaseous and/or liquid fluids suitable for untrained users, especially for refilling a mobile container (such as a gas cylinder) with oxygen in a home environment.

SUMMARY OF THE INVENTION

The present invention is directed toward an improved rapid connection coupling. According to one aspect of the present invention, the improved rapid connection coupling of the present invention provides a coupling having a significantly reduce volume of escaping gas when disconnected from an associated fitting, which significantly reduces the intensity of the sound created by the disconnection process and reduces the risk of a projectile hazard. According to another aspect of the present invention, the improved rapid connection coupling is easy to use for untrained individual without a significant amount of hand strength or dexterity. According to yet another aspect of the present invention, there are no exposed pins or projections that might create a safety issue for the user. According to still another aspect of the present invention, surfaces exposed to damage by a user (wear points) are not used to create seals (the structures forming seals are internal to either the coupling or the fitting), thereby increasing the longevity of such a coupling in the field.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention, wherein:

FIGS. 5B–5E are perspective, top plan, side elevational, and front elevational views, respectively, of rapid connection fitting according to the present invention shown in FIG. 5A;

FIG. 6A is a front elevational view of a sealing piston;

FIG. 6B is a cross-sectional view of a sealing piston taken along the line 6B—6B in FIG. 6A;

FIG. 7A is a front elevational view of a coupling housing;

FIG. 7B is a cross-sectional view of a coupling housing taken along the line 7B—7B in FIG. 7A;

DETAILED DESCRIPTION OF THE INVENTION

Figure 1A:
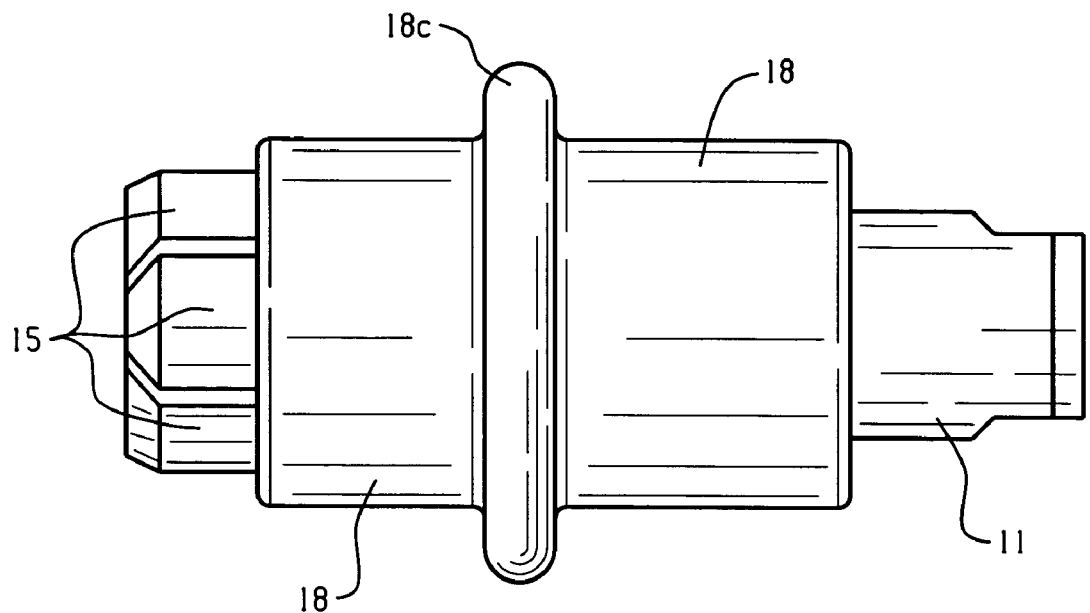
FIG. 1A is a side plan view of a rapid connection coupling according to the present invention.
Figure 1B:
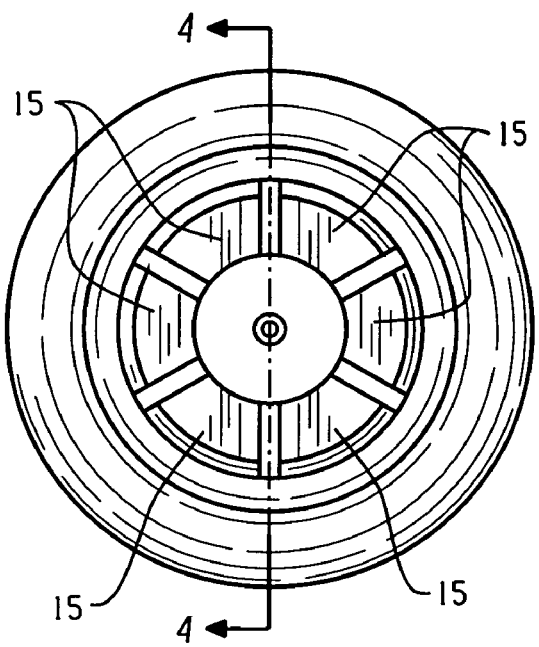
FIG. 1B is an anterior plan view of a rapid connection coupling according to the present invention.
Figure 1C:
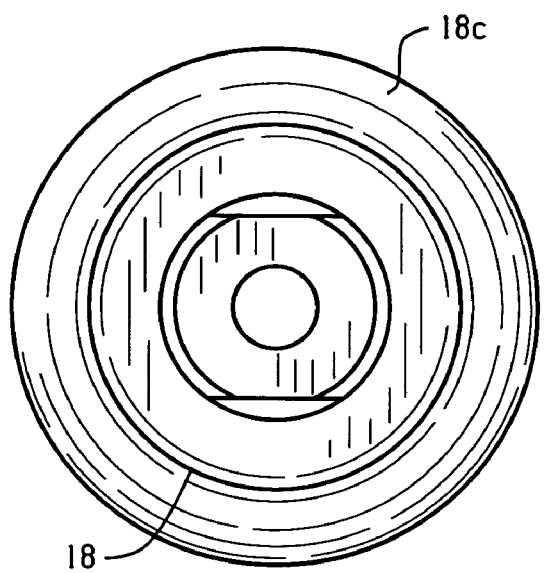
FIG. 1C is a posterior plan view of a rapid connection coupling according to the present invention.
Figure 2:
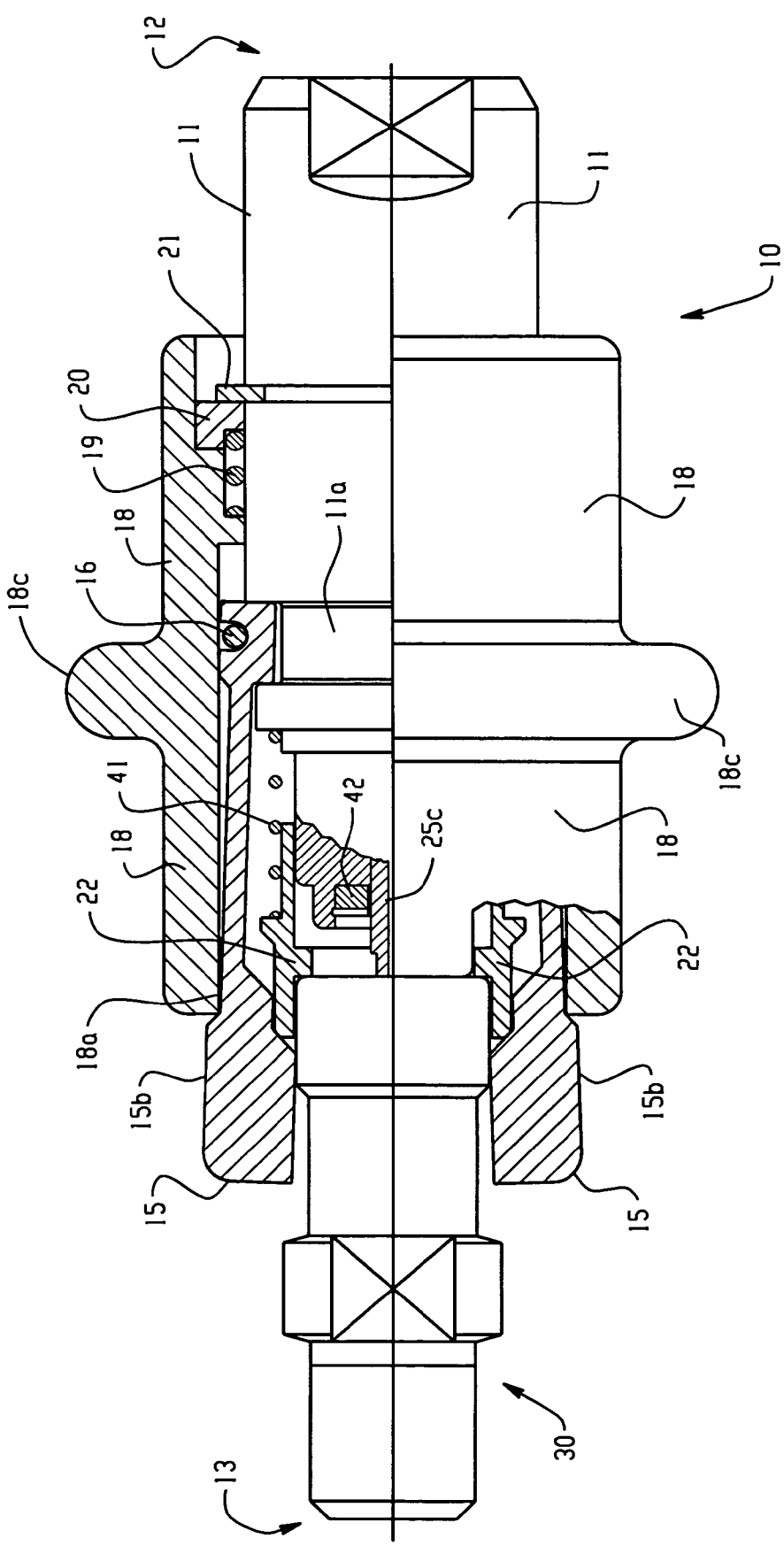
FIG. 2 is a one-quarter cross sectional view (with additional portions cut away) of a rapid connection coupling according to the present invention with a fitting according to the present invention partially inserted therein.

A preferred embodiment of a rapid connection coupling 10 and fitting 30 according to the present invention is shown in FIGS. 1A–16. FIGS. 1A, 1B, and 1C show the rapid connection coupling 10 in plan view without an associated fitting. FIG. 2 shows the rapid connection coupling 10 shortly before the connection to a connection fitting 30. The rapid connection coupling 10 comprises a tubular housing 11, where the right end here serves as the inlet 12 and the left end as the outlet 13 for feeding on the transferred fluid to the connection receptacle, such as a nipple or other fitting 30.

On the outlet 13 end, there are provided several jaws 15 arranged in tubular form and which are radially spread in the position shown in FIG. 2 shortly before plugging on to the connection fitting 30, as is also shown in the previously recited WO-A 93/20378 for example. The elongated jaws 15, of which there are preferably at least three, and more preferably between three and six, and most preferably four, are arranged around the housing 11 and are hooked in an annular groove 11a of the housing 11 at their ends here on the right and are biased by an annular spring (e.g., an O-ring) 16 so that the jaws 15 are radially spread. At the end here to the left, on the inwardly offset surface, the jaws 15 each have an interlocking engagement profile 17 formed in correspondence with the connection profile 31 of the connection fitting 30. For example, in the specific implementation shown in the figures, the fitting 30 has a cylindrical portion 31a and a flared portion 31b (i.e., a frustum of a cone) flaring from the cylindrical portion 31a and the jaws 15 form an engagement profile having a cylindrical portion 17a and a flaring portion 17b flaring from the cylindrical portion 17a, so that when interlocked the cylindrical portions 17a and 31a oppose and engage each other and the flaring portions 17b and 30b oppose and engage each other.

Connection fitting 30 preferably also comprises a housing 33 having a threaded portion 32 and a pneumatic check valve 34. Check valve 34 is preferably a ball and spring type check valve. More specific to the figures, check valve 34 preferably comprises a ball 34a biased by a spring 34b toward a seat surface 34c of an insert 34d inside housing 33. Spring 34b is guided and centered by a centering insert 34e inside housing 33. Ball 34a is urged against first and second O-rings 34f, 34g, which form a seal with ball 34a. Connection fitting 30 preferably also comprises an inlet bore 35, which is formed by a bore 35a in housing 33 and a bore 35b in insert 34d and accepts a second pin of the coupling 10, discussed below. In a middle portion of bore 35, an o-ring 36a and backup ring 36b form a seal 36 with the second pin of coupling 10, discussed below. The fitting 30 also preferably includes a filter 37. The foregoing pieces are held inside housing 33 by a retaining ring (snap ring) 38.

An outer sliding sleeve 18 is provided around the jaws 15 and is guided on the cylindrical outer surface 11b of the housing 11 and is biased by a relatively weak compression spring 19 in the direction of the connection fitting 30. The compression spring 19 abuts the housing 11 via an abutment ring 20 and a retaining ring (snap ring) 21.

A sealing piston 22 is guided on the peripheral surface 11c of the housing 11 disposed towards the outlet 13 and preferably comprises an annular flange 22b for engagement with the front face 39 of fitting 30.

Furthermore, there is a check valve 25 fitted centrally in the housing 11. Check valve 25 is sealed relative to a sealing surface 27 on the housing 11 by means of a first seal 26, preferably comprising sealing ring 26a cooperating with a special hard seat seal 26b, in the closed position shown in FIG. 4B. The check valve 25 is biased by a compression spring 28, which is guided and centered by a centering insert 29 in the housing 11 and abuts the latter. Through this check valve 25 it is ensured that the fluid fed through the housing 11 cannot flow out even with the connecting valve on the refill cylinder or the like open in the uncoupled position or just before the connection of the rapid connection coupling 10 to the connection fitting 30, as shown here in FIG. 2.

The check valve 25 has a centrally arranged first pin 25b and a centrally arranged second pin 25c, both of which slide along the longitudinal axis of the housing 11. First pin 25b functions as a valve plunger and has a conical sealing surface 25a that engages seal 26. Second pin 25c is centered and sealed with respect to housing 11 by a second seal 26', preferably comprising sealing ring 26c cooperating with a backup ring 26d (essentially a plastic washer). (Using the seal 26' as described above will allow a coupling 10 according to the present invention to maintain a high pressure, e.g., 2000 psi, for an extended period of time. In the alternative, seal 26' can be replaced with a metal against metal seal, which will provide a substantial enough seal to allow the coupling 10 and fitting to pressurize a cylinder, e.g., an oxygen cylinder, to 2000 psi or greater, but will also allow the high pressure to slowly leak down to about 100 psi once any compression upstream of the coupling 10 has stopped. Allowing the high pressure to slowly bleed off through the coupling 10 after compression has ceased makes the already easy to operate coupling 10 even easier to use because the user need not overcome the high pressure to use the coupling 10 next time.) A separate stepped, annular brass seat 26e cooperates with housing 11 and seals 26, 26'. First pin 25b preferably includes a very narrow fluid passage therein, which preferably comprises a central bore 25d in fluid connection with at least one radial bore 25e, positioned so the radial bore 25e is completely sealed by seal 26 in the closed position shown in FIG. 4B. Second pin 25c also preferably includes a very narrow fluid passage therein, which is preferably in fluid communication with the fluid passage of first pin 25b. This passage in second pin 25c preferably comprises a central bore 25f positioned to be in fluid communication with central bore 25d of first pin 25b. The second pin 25c preferably includes an integral guide ring 25g cooperating with a surface 11e of housing 11. The second pin is retained in housing 11 by an abutment ring 42 (essentially a brass washer) held in place by a retaining ring (snap ring) 43. First pin 25b preferably includes a narrowed stem portion 25h that serves to guide first pin 25b with respect to seal 26 and seat 26e. The coupling 10 also preferably comprises a filter 44 in the fluid flow. The first pin 25b, seal 26, seal 26', seat 26e, spring 28, centering insert 29, and filter 44 are retained in housing 11 by a retaining ring (snap ring) 45. A stop 29a of the centering insert 29 limits the axial stroke of the first pin 25b of check valve 25. A stop 1 if of the housing 11 limits the axial stroke of the second pin 25c of check valve 25.

Sealing piston 22 is biased by a compression spring 41, which abuts a shoulder 11d of the housing 11 on one side and a shoulder 22a of the sealing piston on the other side. As can be seen from FIG. 2, sealing piston 22 has an annular projection 22c facing towards the outlet 13 that while in the open position engages an inwardly offset region 15a of the jaws 15, whereby they are held in their radially spread, open position. The sealing piston 22 is urged by the compression spring 41 toward the fitting 30 until the projection 22c abuts against the inwardly offset region 15a of the jaws 15, which stops the movement of sealing piston 22.

Figure 3:
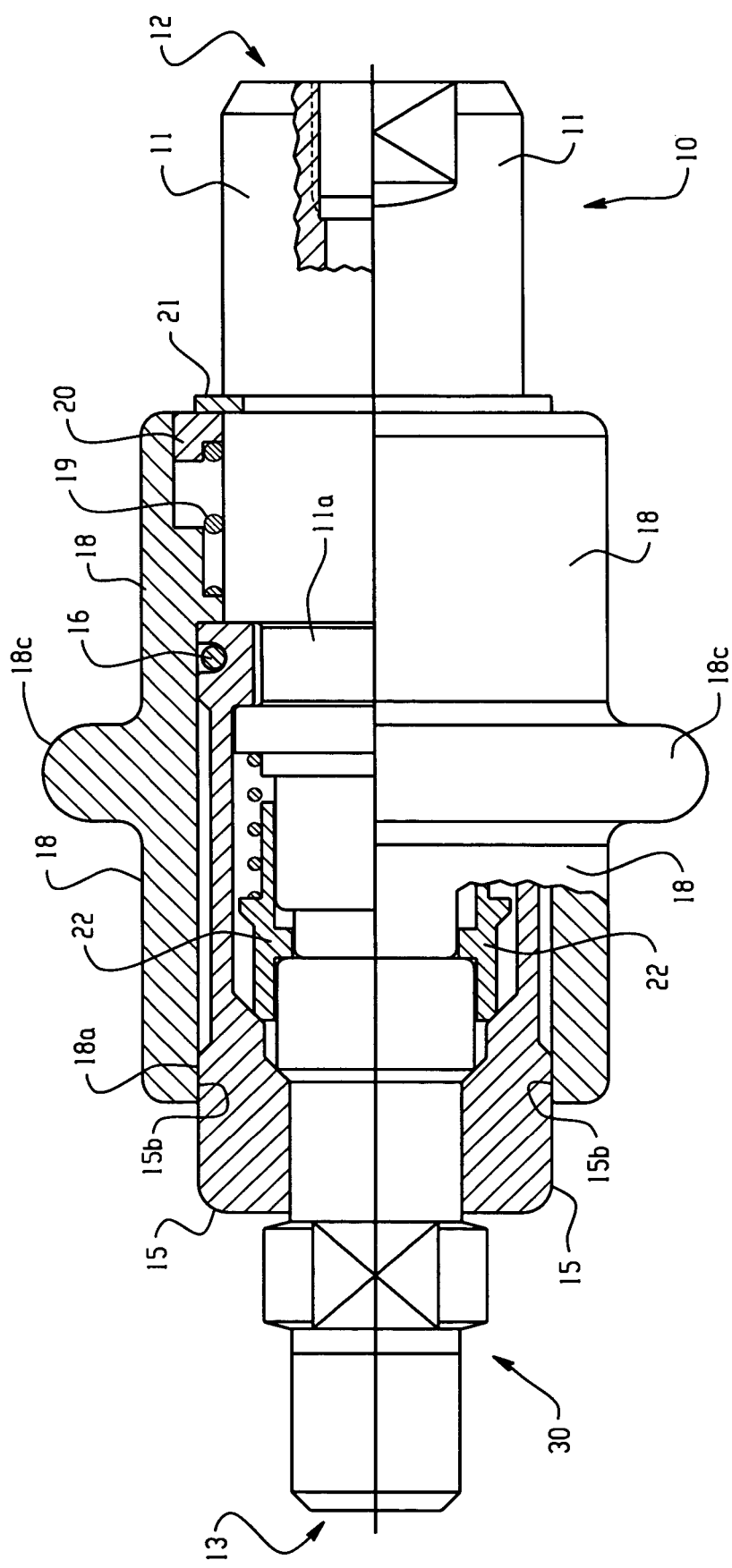
FIG. 3 is a one-quarter cross-sectional view (with additional portions cut away) of a rapid connection coupling according to the present invention fully connected to a fitting according to the present invention.
Figure 4A:
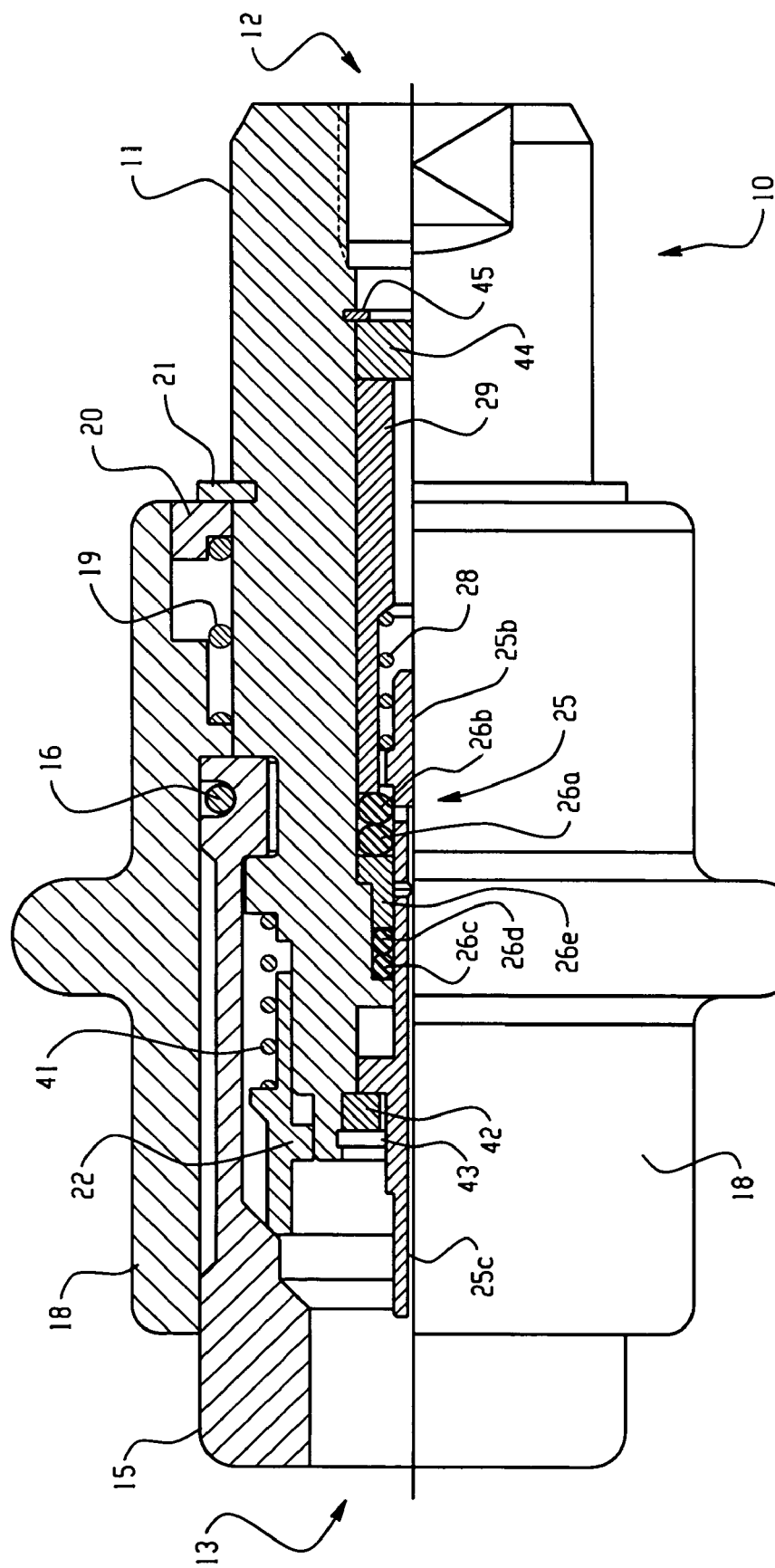
FIG. 4A is a cross-sectional view of a rapid connection coupling and fitting according to the present invention taken along the line 4—4 in FIG. 1B in the fully connected position shown in FIG. 3.
Figure 4B:
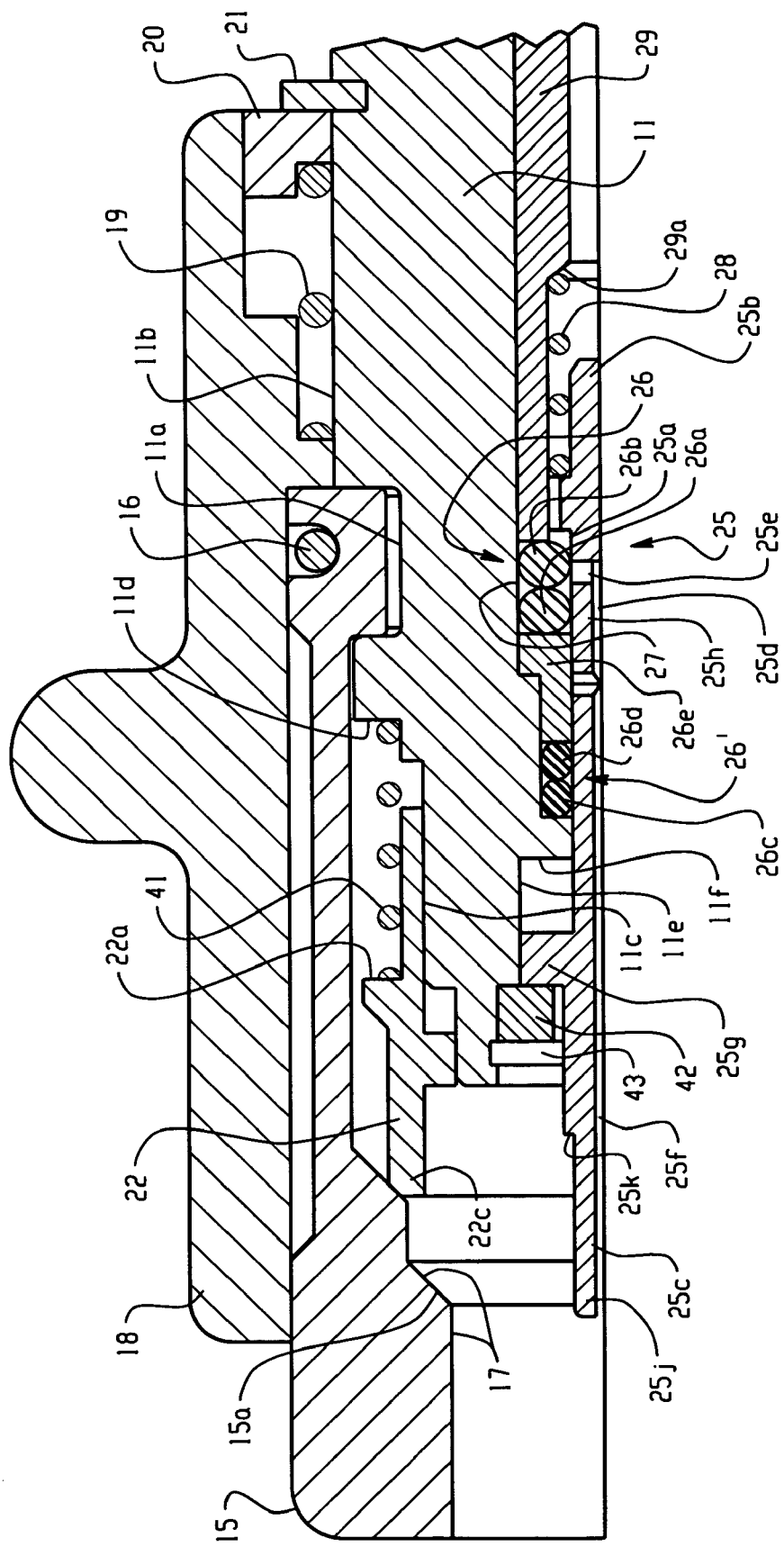
FIG. 4B is a view showing an enlarged portion of FIG. 4A.
Figure 5A:
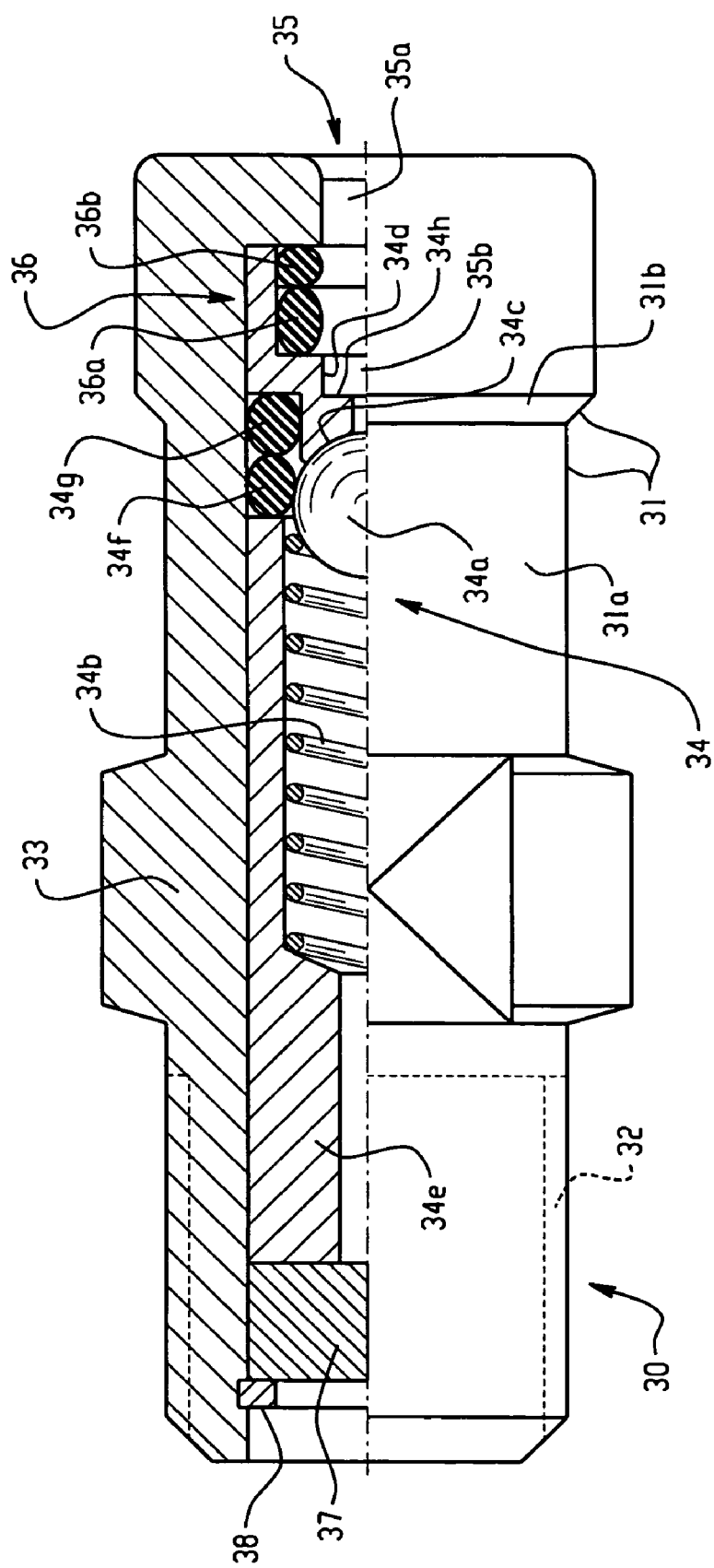
FIG. 5A is a one-quarter cross-sectional view of a rapid connection fitting according to the present invention.
Figure 8A:
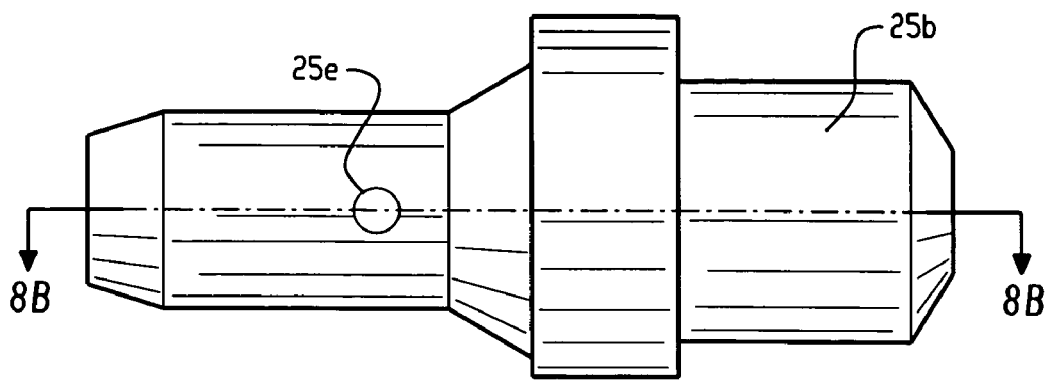
FIG. 8A is a front elevational view of a first pin forming a mechanical check valve.
Figure 8B:
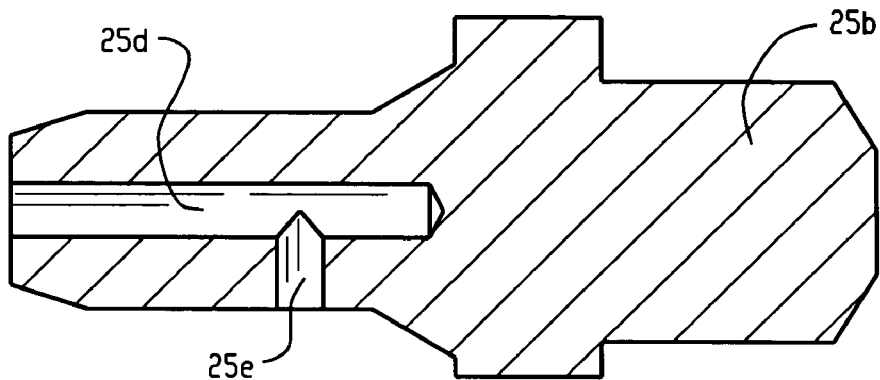
FIG. 8B is a cross-sectional view of a first pin forming a mechanical check valve taken along the line 8B—8B in FIG. 8A.
Figure 8C:
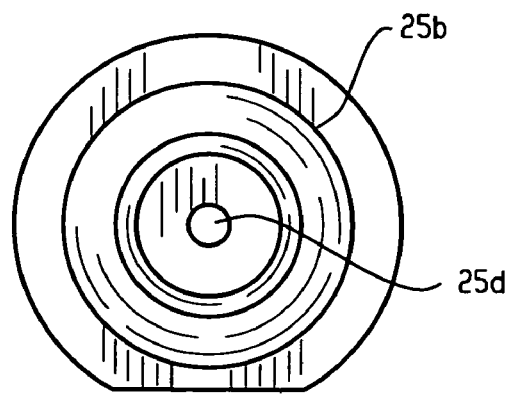
FIG. 8C is a front elevational view of a first pin forming a mechanical check valve.
Figure 9A:
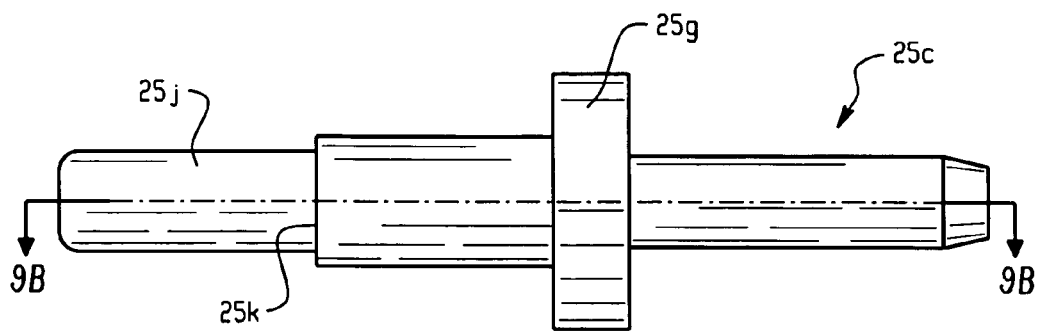
FIG. 9A is a front elevational view of a second pin forming a mechanical check valve.
Figure 9B:
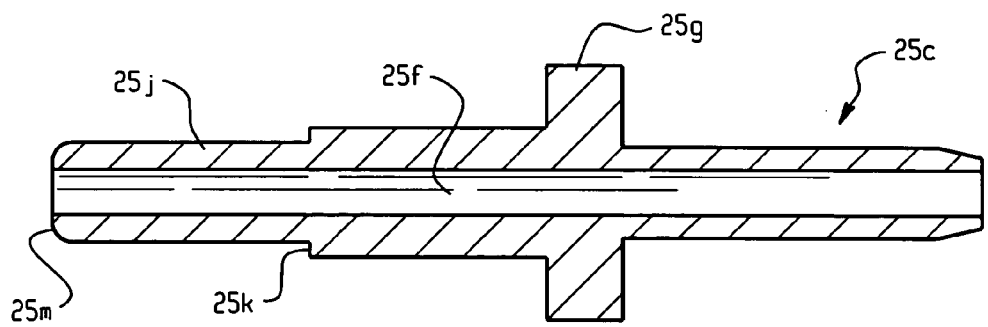
FIG. 9B is a cross-sectional view of a second pin forming a mechanical check valve taken along the line 9B—9B in FIG. 9A.
Figure 9C:
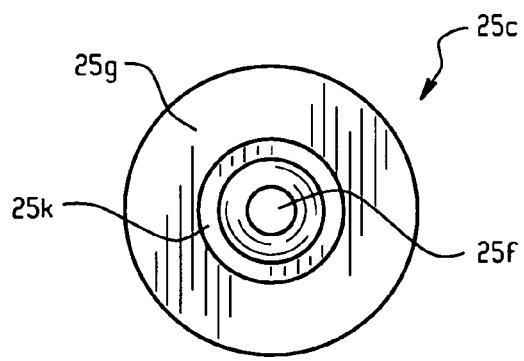
FIG. 9C is a front elevational view of a second pin forming a mechanical check valve.
Figure 10A:
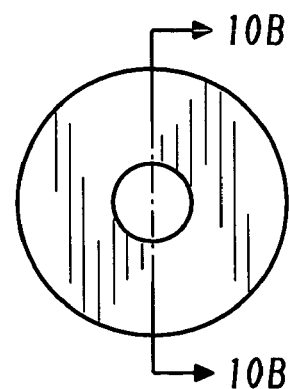
FIG. 10A is a front elevational view of a housing insert.
Figure 10B:
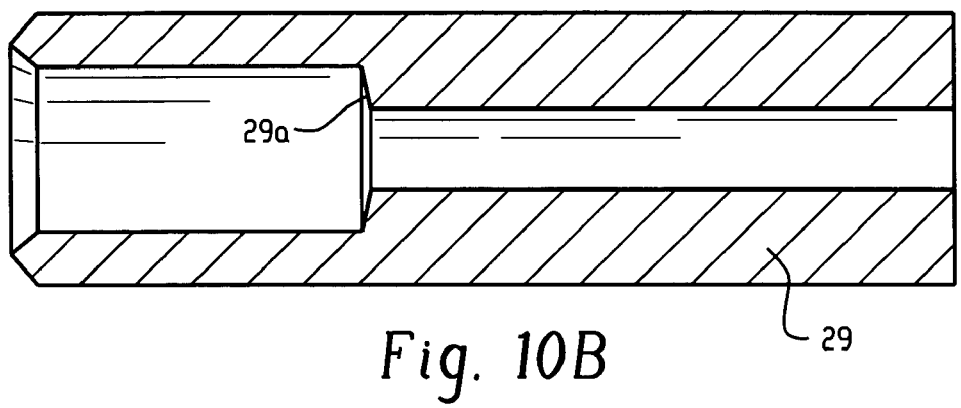
FIG. 10B is a cross-sectional view of a housing insert taken along the line 10B—10B in FIG. 10A.
Figure 11A:
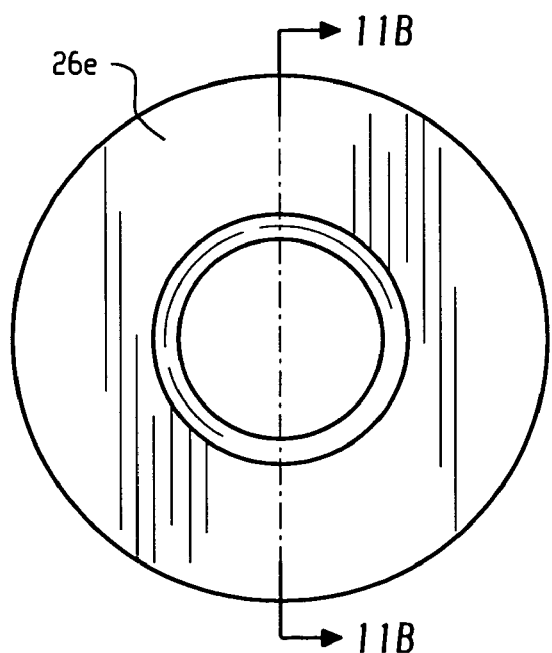
FIG. 11A is a front elevational view of an annular brass seat.
Figure 11B:
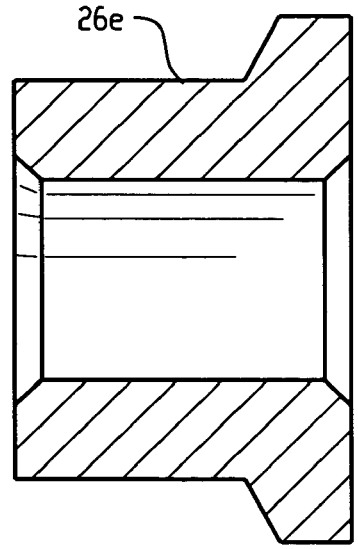
FIG. 11B is a cross-sectional view of an annular brass seat taken along the line 11B—11B in FIG. 11A.

The connected position of the rapid connection coupling and the fitting 30 is shown in FIG. 3. On plugging the rapid connection coupling 10 on to the connection fitting 30, tip 25*j* of second pin 25*c* is inserted into the bore 35 of fitting 30 and serves to align and guide fitting 30 with respect to the coupling 10. As the fitting 30 is further inserted into coupling 10, surface 25*k* of second pin 25*c* engages front surface 39 of fitting 30 and the very tip 25*m* of second pin may also engage ledge 34*h* of insert 34*d*. Thus further movement of fitting 30 into coupling 10 causes second pin 25*c* to move toward first pin 25*b*. Second pin 25*c* cooperates with stem 25*h* of first pin 25*b*, thereby sliding first pin 25*b* toward the inlet end 12, thereby exposing radial bore 25*e* from seal 26, the thereby opening mechanical check valve 25. As the second pin 25*c* is inserted into bore 35 of fitting 30, tip 25*j* engages O-ring 36*a* of fitting 30, thereby forming a seal to prevent escape of fluid. After a small movement (e.g., a few millimeters) of the sealing piston 22 to the right, the inner surfaces 15*a* of the jaws 15 bearing on the projection 22*c* of sliding piston 22 are freed from their blocked position, so that they can snap inwardly, so that the engagement profile 17 can engage with the correspondingly formed connection profile 31 of the connection fitting 30. Practically simultaneously, the sliding sleeve 18 becomes free for axial movement to the left, since the sliding sleeve 18 is biased by the compression spring 19. By virtue of its axial movement, inner surface 18*a* of the sliding sleeve 18 engages over the outer ends 15*b* of the jaws 15, so that they are retained interlocked in their engaged position on the connection fitting 30.

In order to release the rapid connection coupling 10 and thus return to the open position of FIG. 2 from the attached position of FIG. 3, the sliding sleeve 18 is manually retracted. To facilitate this, preferably, the sliding sleeve has a projection, e.g., an integral annular flange 18*c*, extending therefrom, to provide a gripping region. In addition, or in the alternative, the outer surface of sliding sleeve 18 can be provided with knurling or other suitable profiling of the outer surface. After a short movement of the sliding sleeve 18 the jaws 15 can again spread radially, whereby the sealing piston 22 is simultaneously displaced to the left towards the outlet end 13 under the action of the compression spring 41 back into the position of FIG. 2. The jaws 15 are only closed when the sealing contact between the tip 25*j* of second pin 25*c* and the sealing ring 32 of fitting 30 is ensured, since the open position of the jaws 15 is maintained until the closed position of the jaws 15 is enabled by the axial displacement of the sealing piston 22 to produce the connection practically at a stroke.

One advantage of the present invention is that the components of coupling 10 were configured to significantly reduce the volume of fluid released when the coupling 10 releases the fitting 30. This was accomplished by (i) significantly reducing the volume of fluid that will necessarily be released when the coupling 10 releases the fitting 30 and (ii) decreasing the required travel of parts before the flow of fluid is stopped. More specific to the implementation shown in the figures, the volume of fluid released when the coupling 10 releases the fitting 30 is reduced by (i) significantly reducing the volume of the bores within the check valve 25 downstream of seat 26 and (ii) significantly reducing the travel distance of parts required for check valve 25 to stop the flow of fluid.

As to reduced volume of fluid released, the bore 25*d* of first pin 25*b* is about 1 mm (about 0.375 inches) in diameter and is about 5.5 mm (about 0.210 inches) deep. The radial bore 25*e* of first pin 25*b* is about 1 mm (about 0.0375 inches) in diameter and about 1.5 mm (about 0.0575 inches) deep. Therefore, the fixed volume of fluid that will escape from first pin 25*b* when coupling 10 releases fitting 30 is about 5.5 mm$^3$ (about 0.0003 cubic inches). Similarly, the bore 25*f* of second pin 25*c* is about 1 mm (about 0.0375 inches) in diameter and is about 28.5 mm (about 1.125 inches) deep. Therefore, the fixed volume of fluid that will escape from second pin 25*c* when coupling 10 releases fitting 30 is about 22 mm$^3$ (about 0.0012 cubic inches). Also, the fact that tip 25*j* of second pin 25*c* is inserted into bore 35 of fitting 30 allows additional expelled fluid volume to be reduced, because that tip 25*j* fills a significant volume inside bore 35 that might otherwise be filled with high-pressure fluid.

As to reduced amount of travel required for check valve 25 to stop the flow of fluid through first pin 25*b*, when in use, the radial bore(s) 25*e* are displaced from seal 26 in the range of from about 0 mm to about 13 mm, preferably by only about 6.5 mm. Thus, when fitting 30 is released, the first pin 25*b* need only move within that range or that distance to seat, thereby stopping the flow of fluid through first pin 25*b*.

Although the improved rapid connection coupling and fitting according to the present invention can be used in virtually any fluid transfer application, because of their relative ease of use and relatively quiet connection and disconnection the improved rapid connection coupling and fitting according to the present invention have particular utility in the application of filling mobile oxygen containers, e.g., with home-based oxygen cylinder fillers in the home environment and with transfill devices at dealers, etc. The connection and fitting are particularly suited to oxygen refilling in the home environment and can be incorporated in the home oxygen refilling systems taught by Invacare U.S. Pat. No. 5,988,165 and in copending Invacare U.S. patent application Ser. Nos. 09/154,442 (filed on Sep. 16, 1998), and Ser. No. 09/695,612 (filed on Oct. 24, 2000), all of which are hereby incorporated by reference. In the aforementioned patent and both applications, the coupling 10 of the present invention would be used between the compressor 100 and the cylinder 500, with the coupling 10 being in fluid connection downstream of the compressor and the fitting 30 being preferably incorporated into the cylinder 500 to facilitate the rapid and easy connection and disconnection of the cylinder 500 with respect to the coupling 10. Additionally, in the later application, the coupling 10 of the present invention can also replace the fill connector 845 in the unit shown in FIG. 13 and described in that application.

Those skilled in the art will appreciate which materials will be suitable and/or required for the particular coupling application in mind for the coupling 10 and fitting 30 according to the present invention. For example, for the high-pressure oxygen application, brass, stainless steel, PTFE, EDPM, POM, and Gleitmo 595 lubrication are all acceptable for parts coming into contact with the oxygen. Thus, in the coupling 10 and fitting 30 for use with high-pressure oxygen, the O-rings (16, 26*a*, 26*c*, 34*f*, 34*g*, and 36*a*) are preferably made of EPDM, the backup rings (26*d* and 36*b*) are preferably made of PTFE, part 26*b* (L-shape in cross section) is preferably made of POM, the springs and retaining rings (snap rings) contacting the oxygen (43, 45, and 38) are preferably made of 301 or 302 stainless steel, retaining ring (snap ring) 21 is preferably made of coated stainless steel, sleeve 18 is preferably made of an aluminum alloy (0.8% silicium, 0.8% iron, 0.5–1% manganese, 0.4–1.8% magnesium, 0.1% chromium, 0.8% zinc, 0.3% others together, and the rest being aluminum), and the remaining metal pieces (11, 15, 22, 20, 29, 25*b*, 25*c*, 26*e*, 33, 34*e*, and 34*d*) are preferably made of brass (57–59% copper, 2.5%–3.5% lead, 0.1% aluminum, 0.5% iron, 0.5% nickel, 0.4% tin, 0.2% others together, with the rest being zinc).

Figure 12:
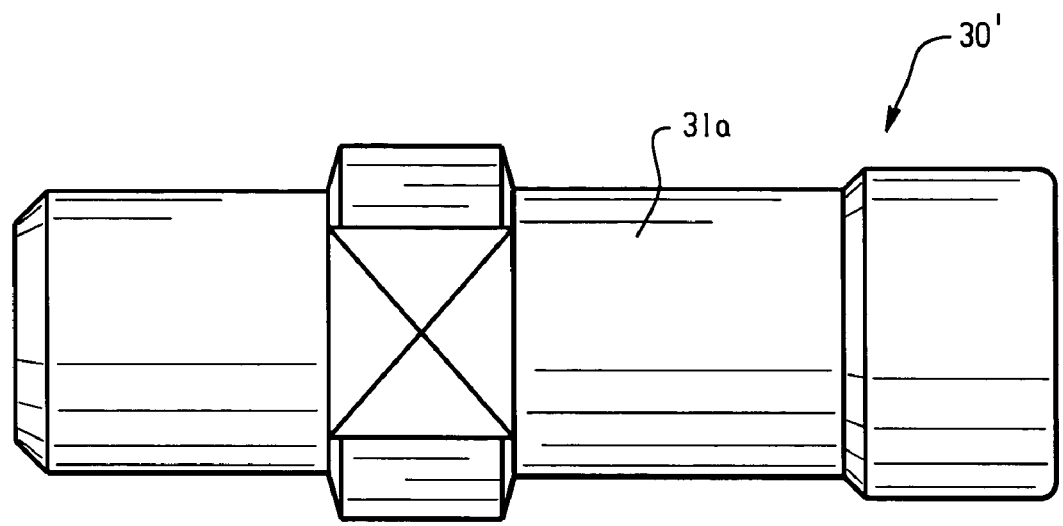
FIGS. 12 and 13 show fittings according to the present invention that can be used to permit and prevent certain cross-uses, as shown in FIGS. 14–16.
Figure 13:
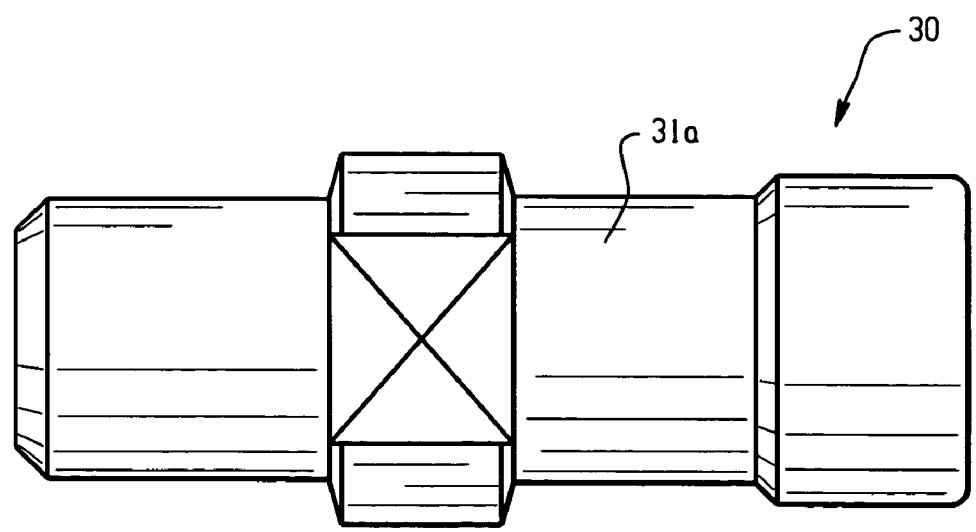
Figure 14:
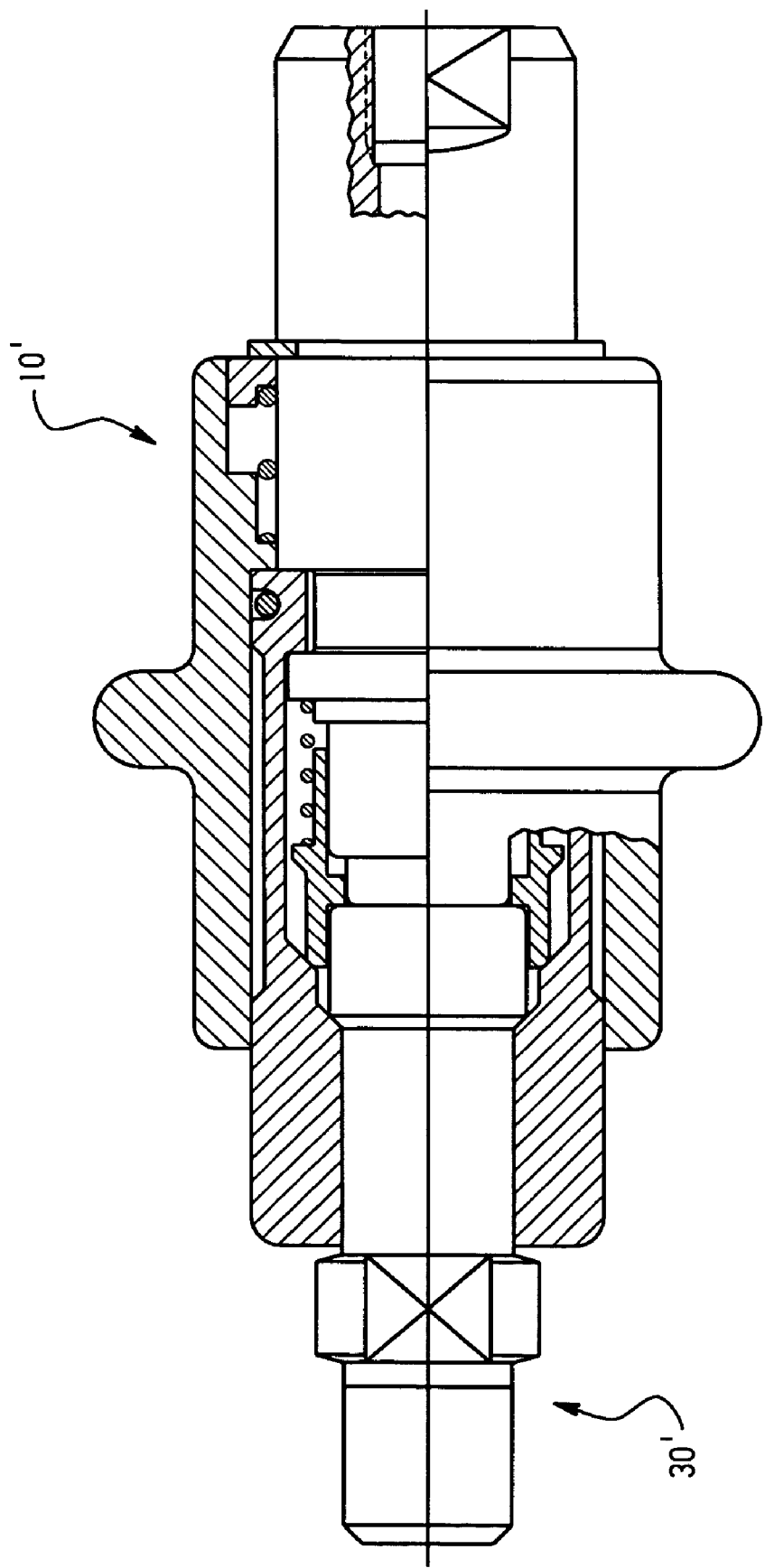
Figure 15:
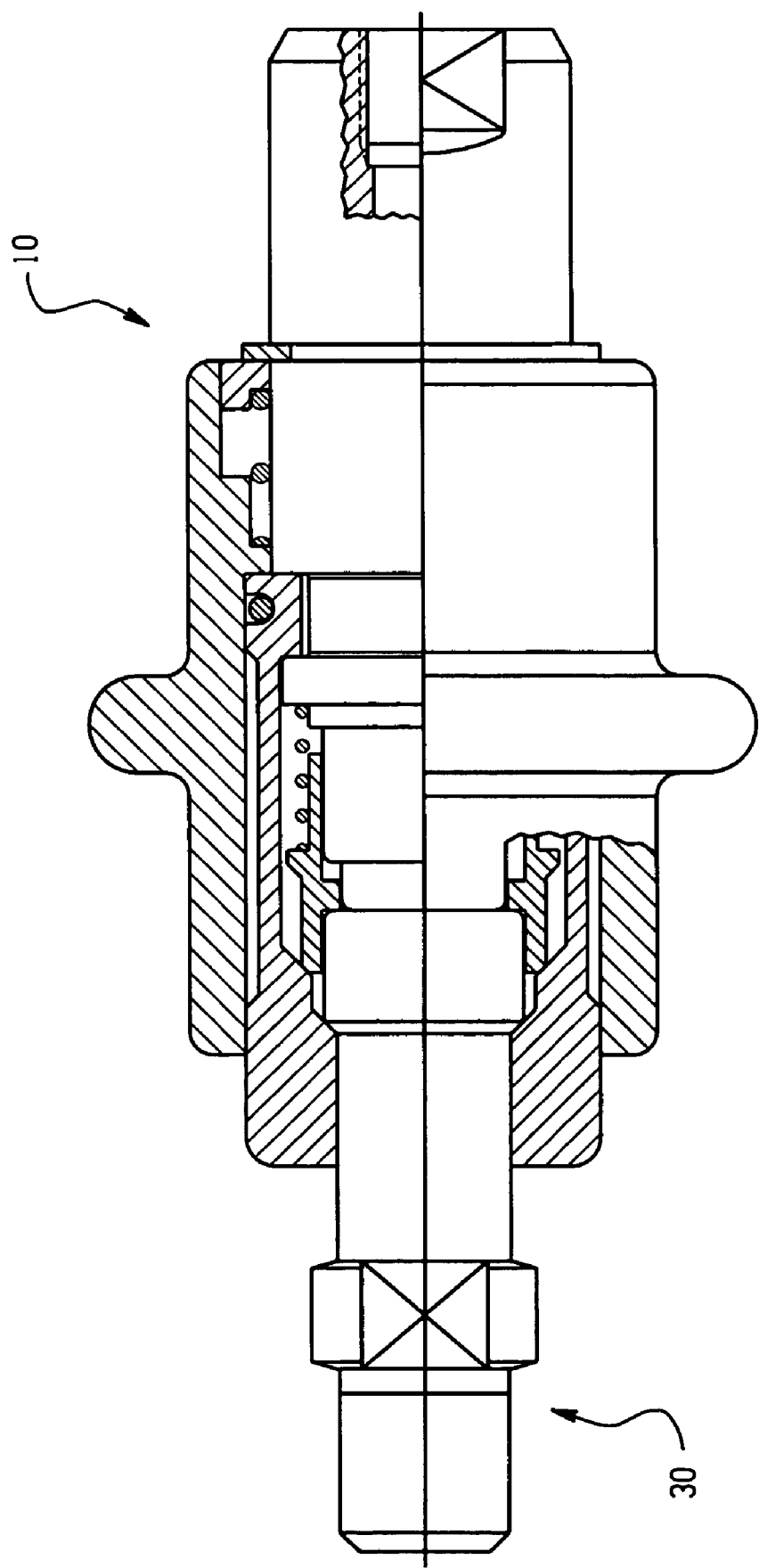
Figure 16:
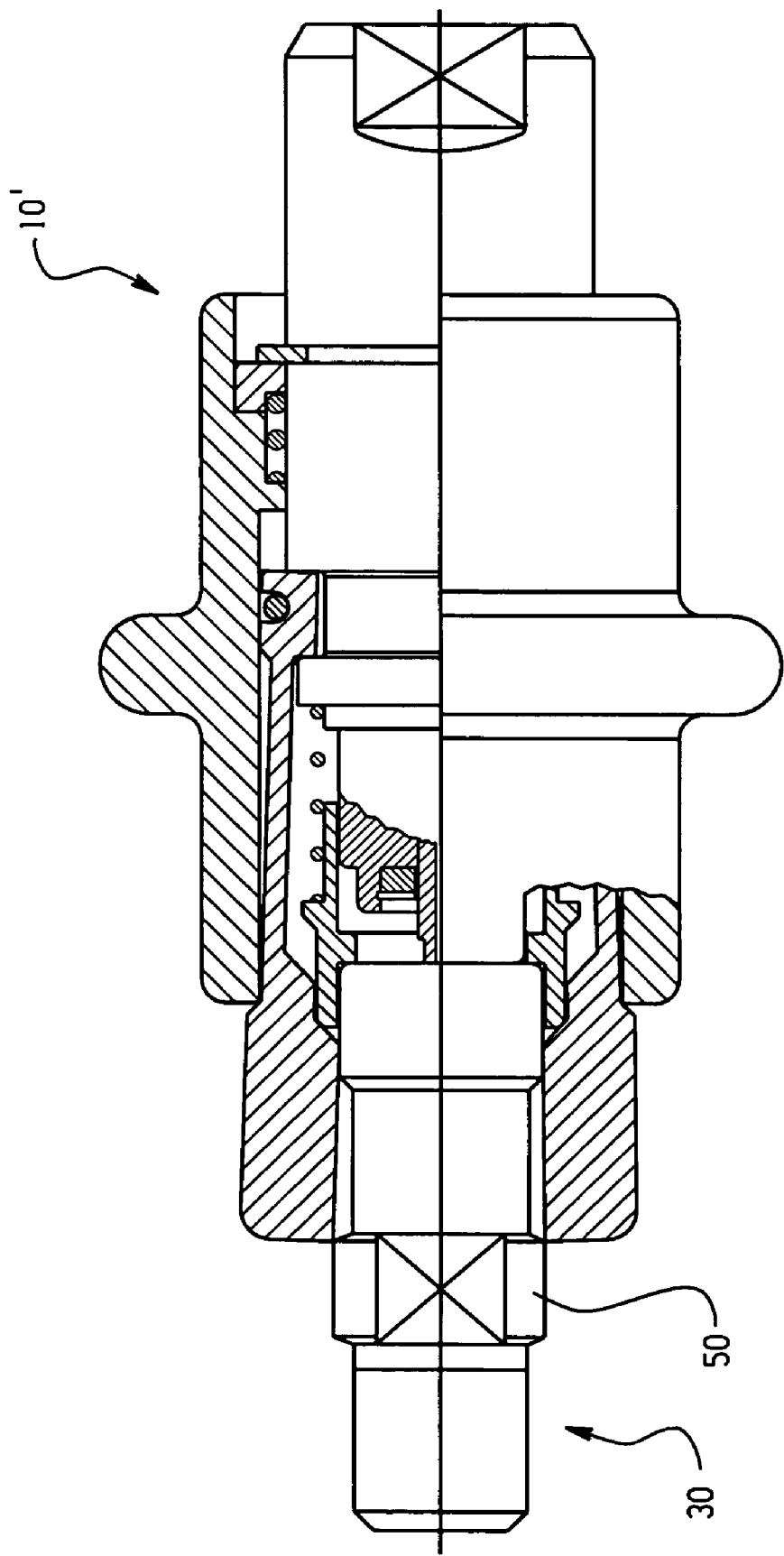

As discussed above, the connection fittings 30 according to the present invention preferably include a cylindrical portion 31a. FIGS. 12 and 13 show two fittings having cylindrical portions 31a of different lengths, corresponding to two different pressures. Fitting 30 can, for example, be designated to be a lower pressure fitting, e.g., 2000 psi, and fitting 30' can, for example, be designated to be a higher pressure fitting, e.g., 3000 psi. Similarly by varying the length of the corresponding portion of jaws 15, as shown in FIGS. 3 and 14–16, it is possible to designate a low pressure coupling 10 and a high pressure coupling 10'. Thus, one can designate a low-pressure fitting 30 (i.e., a low pressure cylinder) that will function with a low pressure coupling 10 (FIG. 3) but will not function with a high pressure coupling 10' because of physical interference between a structure 50 and the jaws 15 (see FIG. 16), thereby preventing a cylinder rated for only 2000 psi from being used with a coupling capable of pressurizing that cylinder to 3000 psi. Similarly, it is possible to designate a high-pressure fitting 30' (i.e., a high-pressure cylinder) that will function with a low pressure coupling 10 (FIG. 15) and will also function with a high pressure coupling 10' (see FIG. 14). This type of differentiation system (varied lengths of cylindrical portions 31a and corresponding jaw portions 15), can also be used to differentiate couplings 10 and fittings 30 based on other criteria, e.g., different gases, etc.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. A rapid connection coupling for transferring high-pressure fluids, including filling a high-pressure, mobile gas cylinder with oxygen, comprising:
   a. a housing having a longitudinal axis, an inlet, and an outlet;
   b. an outer sliding sleeve encircling and slidably mounted relative to said housing to move along the longitudinal axis between a coupled and uncoupled position of the rapid connection coupling;
   c. a plurality of locking members extending from said housing, said locking members capable of spreading radially, said locking members having an engagement profile for connection to a correspondingly formed connection nipple, said sleeve sliding over said locking members, and said sleeve being sized so that said sleeve pushes against said locking members to urge said locking members to couple with the nipple when said sleeve is in the coupled position;
   d. a piston sliding along the longitudinal axis relative to the housing for engagement with the connection nipple, said piston guiding the connection nipple along the longitudinal axis during a process of coupling the connection nipple to the rapid connection coupling, said piston biased to engage said locking members in the uncoupled position of the rapid connection coupling to hold said locking members in an open position, said piston being slidably mounted to move during the process of coupling the connection nipple to the rapid connection coupling to free the engagement of said piston with said locking members, thereby permitting said sleeve to urge said locking members to couple with the nipple;
   e. a first pin sliding along the longitudinal axis relative to the housing, said first pin biased against toward a seal, thereby forming a check valve to selectively block a flow of fluid through the coupling between said inlet and said outlet; and
   f. a second pin sliding along the longitudinal axis relative to the housing, said second pin positioned such that during the process of coupling the connection nipple to the rapid connection coupling, an end of said second pin is accepted into a bore in the connection nipple, said second pin forms a seal inside the bore of the connection nipple, and said second pin engages a portion of the connection nipple so that movement of the connection nipple causes said second pin to slide relative to said housing, said second pin further positioned relative to said first pin so that during the process of coupling the connection nipple to the rapid connection coupling, movement of the connection nipple causes movement of said second pin along the longitudinal axis relative to the housing, which forces said first pin against its bias, thereby opening said check valve, permitting a flow of fluid to flow from the inlet, through an orifice in said first pin, and through an orifice in said second pin into said connection nipple.

2. A rapid connection coupling for transferring high-pressure fluids, including filling a high-pressure, mobile gas cylinder with oxygen, according to claim 1, wherein a relatively small volume of high-pressure fluid will escape when the connection nipple is disconnected from the rapid connection coupling.

3. A rapid connection coupling for transferring high-pressure fluids, including filling a high-pressure, mobile gas cylinder with oxygen, according to claim 2, wherein the volume of high-pressure fluid that escapes when the connection nipple is disconnected from the rapid connection coupling is insufficient to cause the mobile gas cylinder to become a projectile.

4. A rapid connection coupling for transferring high-pressure fluids, including filling a high-pressure, mobile gas cylinder with oxygen, according to claim 1, wherein a volume of high-pressure fluid will escape when the connection nipple is disconnected from the rapid connection coupling, wherein the volume of escaping high-pressure fluid comprises a fixed volume of high-pressure fluid and another volume of fluid, and wherein the fixed volume of high-pressure fluid that escapes when the connection nipple is disconnected from the rapid connection coupling is about 27.5 mm$^3$.

5. A rapid connection coupling for transferring high-pressure fluids, including filling a high-pressure, mobile gas cylinder with oxygen, according to claim 1, wherein a volume of high-pressure fluid will escape when the connection nipple is disconnected from the rapid connection coupling, wherein the volume of escaping high-pressure fluid comprises a fixed volume of high-pressure fluid and another volume of fluid, and wherein the fixed volume of high-pressure fluid that escapes when the connection nipple is disconnected from the rapid connection coupling is about 0.0015 cubic inches.

6. A rapid connection coupling for transferring high-pressure fluids, including filling a high-pressure, mobile gas cylinder with oxygen, according to claim 1, wherein a volume of high-pressure fluid will escape when the connection nipple is disconnected from the rapid connection coupling, wherein the volume of escaping high-pressure fluid comprises a fixed volume of high-pressure fluid and another volume of fluid, and wherein the fixed volume of high-pressure fluid that escapes when the connection nipple is formed primarily of the volume of said orifice in said first pin and the volume of said orifice in said second pin.

7. A rapid connection coupling for transferring high-pressure fluids, including filling a high-pressure, mobile gas cylinder with oxygen, according to claim 1, wherein said one end of said second pin does not extend outward from said housing beyond the point where said locking members extend from said housing.

8. A rapid connection coupling for transferring high-pressure fluids, including filling a high-pressure, mobile gas cylinder with oxygen, according to claim 1, wherein said locking members are biased into the open position.

9. A rapid connection coupling for transferring high-pressure fluids, including filling a high-pressure, mobile gas cylinder with oxygen, according to claim 1, wherein said seal against which said first pin is biased is a metal seal to allow the high pressure to slowly leak down to a lower level once any compression upstream of the rapid connection coupling has stopped.

10. A rapid connection coupling for transferring high-pressure fluids, including filling a high-pressure, mobile gas cylinder with oxygen, according to claim 1, wherein said seal against which said first pin is biased is a metal seal to allow the high pressure to slowly leak down to about 100 pounds per square inch once any compression upstream of the rapid connection coupling has stopped.

11. A rapid connection coupling for transferring high-pressure fluids, including filling a high-pressure, mobile gas cylinder with oxygen, according to claim 1, wherein said seal against which said first pin is biased is a metal seal to allow the high pressure to slowly leak down to about 100 pounds per square inch once any compression upstream of the rapid connection coupling has stopped.

12. A system for filling mobile oxygen containers, comprising:
  a. a compressor;
  b. a rapid connection coupling in fluid communication with said compressor and downstream of said compressor, said rapid connection coupling including:
    i. a housing having a longitudinal axis, an inlet, and an outlet;
    ii. an outer sliding sleeve encircling and slidably mounted relative to said housing to move along the longitudinal axis between a coupled and uncoupled position of the rapid connection coupling;
    iii. a plurality of locking members extending from said housing, said locking members capable of spreading radially, said locking members having an engagement profile for connection to a correspondingly formed connection nipple, said sleeve sliding over said locking members, and said sleeve being sized so that said sleeve pushes against said locking members to urge said locking members to couple with the nipple when said sleeve is in the coupled position;
    iv. a piston sliding along the longitudinal axis relative to the housing for engagement with the connection nipple, said piston guiding the connection nipple along the longitudinal axis during a process of coupling the connection nipple to the rapid connection coupling, said piston biased to engage said locking members in the uncoupled position of the rapid connection coupling to hold said locking members in an open position, said piston being slidably mounted to move during the process of coupling the connection nipple to the rapid connection coupling to free the engagement of said piston with said locking members, thereby permitting said sleeve to urge said locking members to couple with the nipple;
    v. a first pin sliding along the longitudinal axis relative to the housing, said first pin biased against toward a seal, thereby forming a check valve to selectively block a flow of fluid through the coupling between said inlet and said outlet; and
    vi. a second pin sliding along the longitudinal axis relative to the housing, said second pin positioned such that during the process of coupling the connection nipple to the rapid connection coupling, an end of said second pin is accepted into a bore in the connection nipple, said second pin forms a seal inside the bore of the connection nipple, and said second pin engages a portion of the connection nipple so that movement of the connection nipple causes said second pin to slide relative to said housing, said second pin further positioned relative to said first pin so that during the process of coupling the connection nipple to the rapid connection coupling, movement of the connection nipple causes movement of said second pin along the longitudinal axis relative to the housing, which forces said first pin against its bias, thereby opening said check valve, permitting a flow of fluid to flow from the inlet, through an orifice in said first pin, and through an orifice in said second pin into said connection nipple.

13. A system for filling mobile oxygen containers according to claim 12, wherein a relatively small volume of high-pressure fluid will escape when the connection nipple is disconnected from the rapid connection coupling.

14. A system for filling mobile oxygen containers according to claim 13, wherein the volume of high-pressure fluid that escapes when the connection nipple is disconnected from the rapid connection coupling is insufficient to cause the mobile gas cylinder to become a projectile.

15. A system for filling mobile oxygen containers according to claim 12, wherein a volume of high-pressure fluid will escape when the connection nipple is disconnected from the rapid connection coupling, wherein the volume of escaping high-pressure fluid comprises a fixed volume of high-pressure fluid and another volume of fluid, and wherein the fixed volume of high-pressure fluid that escapes when the connection nipple is disconnected from the rapid connection coupling is about 27.5 $mm^3$.

16. A system for filling mobile oxygen containers according to claim 12, wherein a volume of high-pressure fluid will escape when the connection nipple is disconnected from the rapid connection coupling, wherein the volume of escaping high-pressure fluid comprises a fixed volume of high-pressure fluid and another volume of fluid, and wherein the fixed volume of high-pressure fluid that escapes when the connection nipple is disconnected from the rapid connection coupling is about 0.0015 cubic inches.

17. A system for filling mobile oxygen containers according to claim 12, wherein a volume of high-pressure fluid will escape when the connection nipple is disconnected from the rapid connection coupling, wherein the volume of escaping high-pressure fluid comprises a fixed volume of high-pressure fluid and another volume of fluid, and wherein the fixed volume of high-pressure fluid that escapes when the connection nipple is formed primarily of the volume of said orifice in said first pin and the volume of said orifice in said second pin.

18. A system for filling mobile oxygen containers according to claim 12, wherein said one end of said second pin does not extend outward from said housing beyond the point where said locking members extend from said housing.

19. A system for filling mobile oxygen containers according to claim 12, wherein said locking members are biased into the open position.

20. A system for filling mobile oxygen containers according to claim 12, wherein said seal against which said first pin is biased is a metal seal to allow the high pressure to slowly leak down to a lower level once any compression upstream of the rapid connection coupling has stopped.

* * * * *

UNITED STATES PATENT AND TRADEMARK OFFICE
CERTIFICATE OF CORRECTION

| | | |
|---|---|---|
| PATENT NO. | : 7,073,773 B2 | Page 1 of 1 |
| APPLICATION NO. | : 10/109580 | |
| DATED | : July 11, 2006 | |
| INVENTOR(S) | : David A. Nuttall et al. | |

It is certified that error appears in the above-identified patent and that said Letters Patent is hereby corrected as shown below:

Column 4, paragraph 1, line 55, "1 if" should read --11f--.

Signed and Sealed this

Nineteenth Day of December, 2006

JON W. DUDAS
*Director of the United States Patent and Trademark Office*